United States Patent [19]

Bardachenko et al.

[11] Patent Number: 5,576,705
[45] Date of Patent: Nov. 19, 1996

[54] INFORMATION INPUT DEVICE

[75] Inventors: Vitali F. Bardachenko, Kiev, Ukraine; Vitali I. Khokhlov, Moskau, Russian Federation; Michael Münker, Munich, Germany; Igor O. Shurchkov, Moskau, Russian Federation

[73] Assignee: Ernst-Otto Schneider, Munich, Germany

[21] Appl. No.: 278,044

[22] Filed: Jul. 20, 1994

[30] Foreign Application Priority Data

Jan. 21, 1992 [DE] Germany .............. 42 01 488.3

[51] Int. Cl.[6] ............................................. H03M 11/00
[52] U.S. Cl. .................... 341/20; 341/22; 341/26; 345/179; 178/18
[58] Field of Search .................... 341/20, 22, 26; 345/173, 179, 180, 182, 183; 178/18, 19, 20

[56] References Cited

U.S. PATENT DOCUMENTS

| | | | |
|---|---|---|---|
| 4,532,497 | 7/1985 | Danish | 341/22 |
| 5,189,417 | 2/1993 | Caldwell et al. | 341/26 |
| 5,194,862 | 3/1993 | Edwards | 341/20 |
| 5,251,123 | 10/1993 | Reiffel et al. | 345/179 |
| 5,448,024 | 9/1995 | Kawaguchi et al. | 345/179 |
| 5,450,348 | 9/1995 | Roemersma | 178/18 |

Primary Examiner—John K. Peng
Assistant Examiner—Andrew Hill

[57] ABSTRACT

An information input device is provided comprising a connecting matrix, a voltage source, a probe pin coupled to said voltage source, a first multiple channel delay circuit, a second multiple channel delay circuit, a NOR circuit with multiple inputs, a first pulse generator having a trigger input connected to an output of said NOR circuit and a reset input connected to the output of said first multiple channel delay circuit, and a second pulse generator having a trigger input connected to the output of said NOR circuit and a reset input connected to the output of said second multiple channel delay circuit.

8 Claims, 1 Drawing Sheet

INFORMATION INPUT DEVICE

BACKGROUND OF THE INVENTION

1. Field of the Invention

The present invention relates to a manual information input device which can be used for inputting information for example into distributed data processing systems.

2. Description of the Background Art

As far as the wide spread of the distributed data processing systems is concerned, the desire nowadays is strong to economically use extended connecting wires between different components of the data processing systems, in particular between input devices and the data processing means.

The large spread of extended multiple wire connecting lines requires great expenditure since such connecting lines use expensive conducting materials, such as copper.

Therefore the problem of reducing costs concerning these connecting wires in order to increase the economy of the distributed data processing systems has become extremely topical.

One attempt to solve this problem is through the reduction of the number of the wires in the connecting lines, in particular through the employment of two-wire connecting lines. However, the employment of such two-wire connecting lines results in a decrease of the operational speed of known input devices and a decrease in their response.

Furthermore, known information input devices have insufficient noise immunity when information is transmitted by long connecting lines and also have a considerable energy consumption.

A conventional input device (Su, A, 1070533) comprises a keyboard consisting of keys, and a sound wave generator is disposed beneath each of the keys. Beneath this, a wave transmitting plate is arranged, which, when contacted by the sound wave generator, transmits ultrasonic waves in all directions from the contact point. This device also comprises sound wave receivers which are arranged such that coordinate values X and Y of a contacting point can be determined within a pre-determined rectangular coordinate system. Thereby the input information can be coded without detecting keys' position. By means of these techniques, the costs of the information input device can be decreased substantially.

However, the device in question requires a coupling of its output with a multiple wire transmitting line, because its output signal is represented by a digital code comprising plural bits. The number of wires of the transmitting line for transmitting such signals is determined by the number of the bits, of which there are usually at least 5.

The experts in this technical field have knowledge that the digital code correspondingly converted which has been generated at the output of said information input device can be serially transmitted through a transmitting line having a reduced number of wires which, however, leads to an substantial decrease in the operational speed of the input device and a prolongation of the information transmission time. I.e., the high operational speed of the above information input device cannot be ascertained without using the multiple wire transmission line.

Further, the reliability of information input by means of the above described device is not high enough due to a complicated signal processing requiring the conversion of the sound signals into electric signals.

Another known information input device (SU, A, 11 15040) has the objective to increase the reliability of the input information. This known input device includes a connecting matrix of conductor lines having a plurality of parallel horizontal row conductor lines and parallel vertical column conductor lines, extending orthogonally to the row conductor lines, and the crossing points of the row conductor lines and the column conductor lines form nodes of the connecting matrix. Further, this known device includes a voltage source for voltage supply, a probe pin being connected to the voltage source and being connectable to the nodes of the connecting matrix for generating signals corresponding to the coordinate information being entered.

These signals are generated time-sequentially by closing the row conductor lines and the column conductor lines crossing in a respective node of the connecting matrix and being energized with an energizing voltage from the voltage source.

Two coded signals comprising five elements are generated sequentially at outputs of an encoding unit being connected to the row conductors of the connecting matrix and to corresponding vertical conductors, said coded signals identifying the input information and representing the signals by pulse amplitude modulation. Therefore, it is required to transmit the parallel codes of said two sequential coded signals by a transmitting line having five wires.

One draw-back of the above described input device according to SU,A,1115040 is that, as in the preceding case, the device cannot guarantee a high operational speed without using a multiple wire transmission line for the transmission of the input information.

It is to be noted that the operational speed of the latter input device is considerably decreased by the fact that for each input of each record the sequential closing of the vertical conductors and the horizontal conductors is required.

Further, as mentioned above, the described device uses pulse amplitude modulation of the signals to be transmitted through each transmission line, wherein the pulse amplitude modulation is known to have a low noise immunity.

By virtue of this low noise immunity, the output signals of the above described input device cannot be transmitted over large distances without being additionally converted, thereby limiting the length of the transmission lines between the information input devices and a data processing apparatus connected thereto.

SUMMARY OF THE INVENTION

An object of the present invention is to provide an information input device having a construction which allows the transmission of input data through two-wire connecting lines over large distances while keeping high operational speed, high noise immunity and high reliability.

According to the first aspect of the invention, an information input device, comprises:

a connecting matrix including a plurality of n first parallel row conductor lines and a plurality of m first parallel column conductor lines being disposed orthogonally to said row conductor lines, m being equal to or unequal to n, and the crossing points of said first row conductor lines and said first column conductor lines forming nodes of the connecting matrix;

a voltage source;

a probe pin being coupled to said voltage source for connecting with and closing the row conductor lines and the column conductor lines at the nodes of the connecting matrix;

a first multiple channel delay circuit, the number of channels of said first multiple channel delay circuit depending on the number n of the first row conductor lines, wherein the delay time in each of said channels differs from the delay time in all other channels of said first multiple channel delay circuit, the input terminal of each channel of said first multiple channel delay circuit being connected to first ends of associated conductor lines of said first row conductor lines of said connecting matrix and the output terminals of said channels being connected together and forming the output terminal of said first multiple channel delay circuit;

a second multiple channel delay circuit, the number of channels of said second multiple channel delay circuit depending on the number m of said first column conductor lines, wherein the delay time in each of said channels of said second multiple channel delay circuit differs from the delay time in all other channels of said second multiple channel delay circuit, the input terminal of each channel being connected with first ends of associated conductor lines of said first column conductors and the output terminal of said channels being connected together and forming the output of said second multiple channel delay circuit;

a NOR circuit having multiple inputs being connected either to all second ends of said first column conductor lines or to all of said first row conductor lines;

a first pulse generator having its trigger input connected to an output of said NOR circuit and its reset input connected to said output of said first multiple channel delay circuit; and a second pulse generator having its trigger input connected to said output of said NOR circuit and its reset input connected to said output of said second multiple channel delay circuit, wherein the duration of pulses generated at the respective output terminals of said first and second pulse generators correspond respectively to the coordinates of row conductor line and column conductor line being closed and energized by the probe pin, wherein the number of the channels of said first multiple channel delay circuit is equal to or greater than n/2;

said n first row conductor lines comprise a first portion of row conductor lines their number corresponding to said number of said channels of said first multiple channel delay circuit, said first portion of row conductor lines being provided as single row conductor lines within the connection matrix and the remaining portion of said first row conductor lines comprising additional row conductor lines, each additional row conductor line adjacent to an associated line of said first row conductor lines, wherein the additional row conductor lines also form the nodes of the connecting matrix in combination with crossing column conductor lines and in combination with said adjacent first row conductor lines, first end terminals of all said additional row conductor lines being connected together and to an input of a first additional delay element having an output being connected to said output of said first pulse generator, said first additional delay element generating a signal being inverted with respect to the signal at the output of said first pulse generator a pre-determined fixed time interval after a contact of said probe pin at a respective node of the connecting matrix is effected within the region of said additional row conductor lines, whereby said inverted signal is an indication that the duration of said output pulses generated by said first pulse generator indicates the respective coordinate of a row conductor line of the second portion within the region of said additional row conductor lines.

The above described construction of the input device according to the invention allows data transmission through largely extended two-wire connecting lines with high speed due to the codification of the input information without using a special coding unit.

According to the present invention, the input device transmits the data through a two-wire transmission line, since each pulse generator has only one output terminal. As a result of the pulse duration modulation the noise immunity of the data transmission is increased, thus making it possible to transmit the input information via very long transmission lines.

Further, the construction of the input device according to the invention makes it possible to increase the operational speed of the input device by simultaneously and not sequentially closing the corresponding row and column conductor lines of the connecting matrix.

The preferred construction of the multiple channel delay circuit permits essential simplification of the input device and a large increase in its reliability.

BRIEF DESCRIPTION OF THE DRAWINGS

The enclosed single

DESCRIPTION OF THE PREFERRED EMBODIMENT

Figure 1:
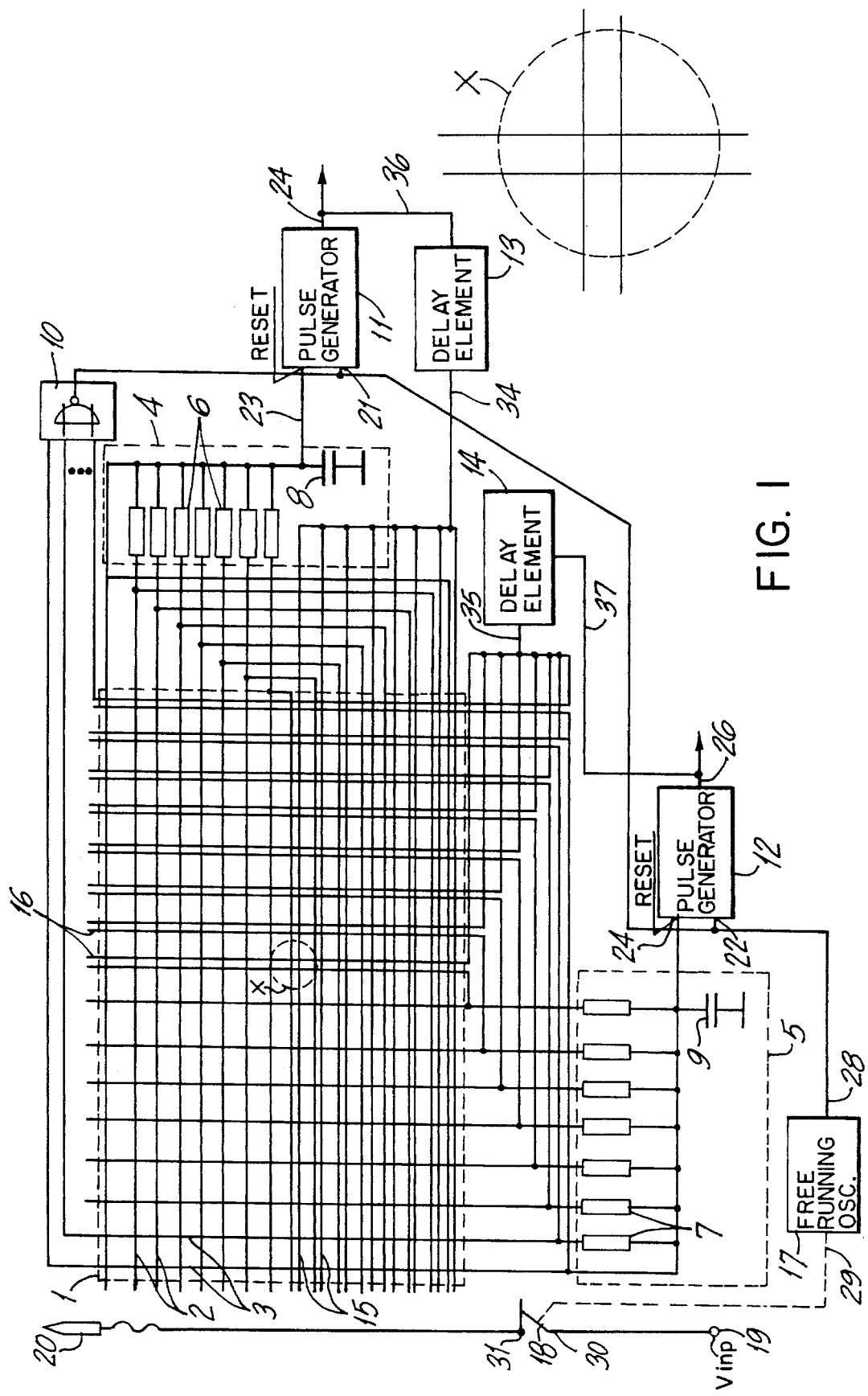
FIG. 1 shows a schematic principal construction of a preferred embodiment of an information input device according to the invention.

The information input device according to the invention comprises a conductor line connecting matrix 1, consisting of a plurality of n first row conductor lines 2 extending in a first direction in parallel to one another and a plurality of m first column conductor lines 3 extending in parallel and in a second direction orthogonally to the first row conductor lines 2.

Crossing points of the n first row conductor lines 2 and the m first column conductor lines 3 form nodes of the connecting matrix 1. The numbers n, m of the first row conductor lines 2 and the first column conductor lines 3 are even numbers and may or may not be equal. In the example in FIG. 1, n=m=16.

A first multiple channel delay circuit 4 is connected to first ends of the first row conductor lines 2 of the connecting matrix 1.

The number of the channels of the first multiple channel delay circuit 4 depends on the number n of the first row conductor lines 2. An input terminal of each channel of the first multiple channel delay circuit 4 is connected to two corresponding first row conductor lines 2, wherein the input terminal of the first channel is connected to the first and the n-th (in the embodiment 16-th) line of the first row conductor lines, and the input terminal of the second channel is connected to the second (n-1)th (in the embodiment 15-th) line of the first row conductor lines, and so on in this order. The outputs of all channels of the first multiple channel delay circuit 4 are connected together and form the output of the first multiple channel delay circuit 4.

It is important that the delay time of each channel of the first delay circuit 4 is different from the delay time in any other channel of said first multiple channel delay circuit 4.

A second multiple channel delay circuit 5 is connected to first ends of the first column conductor lines 3 of the connecting matrix 1 in the same manner as the connection of the first multiple channel delay circuit 4 with the row conductor lines 2. The number of the channels of said second delay circuit 5 is determined by the number m of the first column conductor lines 3 of the connecting matrix 1.

An input terminal of each channel of the second multiple channel delay circuit 5 is connected to two corresponding first column conductor lines 3, wherein the input terminal of the first channel is connected to the first and the m-th (in the embodiment the 16th) line of the first column conductor lines 3, the input terminal of the second channel is connected to the second and (m-1)th (in the embodiment the 15th) line of the first column conductor lines 3, and so on in this order. The outputs of all channels of the second multiple channel delay circuit 5 are connected together and form the output of said second multiple channel delay circuit 5.

It is also important that the delay time of each channel of the second multiple channel delay circuit 5 is different from the delay time in any other channel of said second multiple channel delay circuit 5.

In the preferred embodiment of the present invention said first and second multiple channel delay circuits 4 and 5 respectively comprise a plurality of corresponding resistors 6 and 7. The numbers of said resistors 6, 7 are respectively determined by one half of the numbers n and m of the first row and column conductor lines 2 and 3, and the resistance value of each resistor is made different from the resistance values of all other resistors in said first and second multiple channel delay circuit 5. As shown in FIG. 1, the resistors 6, 7 of the first channels may have resistance values 0Ω which is symbolized by said resistors being mere conductors. One terminal of each of said resistors 6 and 7 is connected respectively to the corresponding lines of the first row conductor lines 2 and column conductor lines 3.

The second terminals of said resistors 6 of the first multiple channel delay circuit 4 are connected together and to a first terminal of a first capacitor 8. And the second terminals of said resistors 7 of the second multiple channel delay circuit 5 are connected together and with a first terminal of a second capacitor 9. The second terminals of the capacitors 8 and 9 are respectively connected to ground.

Instead of the resistors and capacitors of the preferred embodiment of the present invention, each of said multiple channel delay circuits 4 and 5 may comprise a saw-tooth voltage generator and a transmission voltage generator in each channel.

A multiple input NOR circuit 10 is connected with each second input terminal of the column conductor lines 3 of the connecting matrix 1. It is obvious that the NOR circuit 10 can be connected to the column conductor lines 2 of the connecting matrix 1 with equal result.

In order to reduce the number of input terminals of the NOR circuit 10, it is appropriate to connect the input terminals of NOR circuit 10 to the column conductor lines 3 of the connecting matrix 1, if the number m of said first column conductor lines 3 is smaller than n of the first row conductor lines. Vice versa, if the number n of the first row conductor lines 2 is smaller than the number m of the first column conductor lines 3, it is better to connect the input terminals of the NOR circuit 10 to the row conductor lines 2. In the latter case, of course, these second ends are not open.

The output of the NOR circuit 10 is connected to trigger input terminals 21, 22 of first and second pulse generators 11 and 12. Reset inputs of the pulse generators 11 and 12 are connected to the outputs of the first and the second multiple channel delay circuits 4 and 5, respectively. Outputs 25, 26 of the first and second pulse generators 11 and 12 respectively represent outputs of the present information input device.

The reset terminal 23 of the first pulse generator 11 is connected to the connecting point of the resistors 6 with the capacitor 8 of the first multiple channel delay circuit 4, and the reset terminal 24 of the second pulse generator 12 is connected to the connecting point of the resistors 7 with the capacitor 9 of the second multiple channel delay circuit 5.

It is preferable to implement monostable IS-multi-vibrators type 564 TM2 as pulse generators 11 and 12. The pulse durations of output pulses of the first and second pulse generators 11 and 12 respectively depend on the time interval between the triggering signals at their trigger input terminals 21, 22 and the resetting signals at their reset terminals 23, 24.

The connecting matrix 1 of the embodiment further comprises n/2 additional row conductor lines 15 each provided in parallel and adjacent to one first conductor line of the second half of said first row conductor lines 2. In the example shown in FIG. 1, eight additional row conductor lines 15 are provided respectively in parallel and adjacent to the 9th to 16th first row conductor lines 2. Further, m/2 additional column conductor lines 16 are provided respectively in parallel and adjacent to first column lines 3 of the second half of said first column conductor lines 3. In the example shown in FIG. 1, eight additional column conductor lines 16 are provided respectively in parallel and adjacent to the 9th to the 16th first column conductor lines 3.

Crossing points of the additional row conductor lines 15 with the additional column conductor lines 16 also form respective connection nodes X of the connecting matrix 1 in combination with the associated crossing points of the first column conductor lines 3 with the first row conductor lines 2, because all these associated crossing points are closed simultaneously, see the enlarged detail of node X in FIG. 1.

The present information input device further comprises additional delay elements 13 and 14, the input terminals 34, 35 of which are respectively connected to first ends of all additional row conductor lines 15 and to first ends of all additional column conductor lines 16, respectively, and the output terminals 36, 37 of which are connected to the corresponding output terminals 24 and 26 of the first and second pulse generators 11 and 12, respectively.

The information input device of the present invention further comprises a free-running oscillator 17 with a delayed oscillation start, the input 28 thereof being connected to the output of the NOR circuit 10 and the output 20 thereof being connected to a control input of an on-off controllable switch 18. The input terminal 30 of the switch 18 receives an energizing voltage $V_{inp}$ from a voltage source 19. The output terminal 31 of the switch 18 is connected to a probe pin 20.

The information input device of the described embodiment operates as follows:

The input of information is carried out in that the circuit is closed by means of the probe pin 20, which is connecting the voltage of the source 19, via the switch 18 to a node X of the connecting matrix 1. Thereby, the respective row conductor lines 2 (and 15) and the corresponding column conductor lines 3 (and 16) of the connecting matrix 1 are effectively closed simultaneously at the corresponding node X.

In this manner, the energizing voltage is applied from the voltage source 19 via the closed switch 18 to the corresponding node X of the connecting matrix 1. Thereby the first row conductor 2 and the first column conductor 3 of the connecting matrix 1 are closed simultaneously at the corresponding node X together with the additional row conductor line 15 and column conductor line 16 if the latter are present at the location of that node X.

In this way, the energizing voltage from the voltage source 19 is transferred to the corresponding channels of the first and the second multiple channel delay circuits 4 and 5, respectively.

Simultaneously, the energizing voltage from the voltage source 19 is applied to the corresponding input terminal of the NOR circuit 10 providing at its output a triggering pulse applied to the trigger terminals 21, 22 of both of the first and second pulse generators 11 and 12.

The first and second multiple channel delay circuits 4 and 5 are delaying the signals applied to their input terminals according to the respective time constants of the resistor-capacitor combinations. The delayed signals are conducted from the outputs of the first and second delay circuits 4 and 5, respectively, to the corresponding reset input terminals 23, 24, thereby resetting the first and second pulse generators 11 and 12 at time points respectively corresponding to the different delay times created by the respective channels of the first and the second multiple channel delay circuits.

As a result, the durations of the pulses generated at the output terminals 24, 26 of the first and second pulse generators 11 and 12 are respectively proportional to the delay time of the signals in the respective channel of the multiple channel delay circuits 4 and 5, respectively.

The delay of the input signals is effected as indicated below.

When the energizing voltage $V_{in_p}$ is applied to the input terminals of multiple channel delay circuits 4 and 5, the capacitors 8 and 9 are respectively charged through the resistors 6 and 7 to a voltage V which equals $$V = V_{inp} (1 - e^{-t/RC})$$

wherein t: is the time which has elapsed since the application of the energizing voltage;

C: is the charging capacity of the capacitor;

R: is the resistance value of the resistor through which the capacitor is charged.

As an example, the capacitor is charged to $V=0{,}632\ V_{inp}$ within the time $\tau = RC$.

As a result, the pulse durations at the output terminals of the first and second pulse generators 11, 12 depend on the respective resistance values of the respective resistors 6 and 7 which are connected to the row conductor lines and the column conductor lines 2 and 3 closed at the same time by the probe pin 20.

The pulses at the output[s] terminals 24, 26 are transmitted through a two-wire transmission line (not shown) and can be received by a data processing apparatus (not shown).

As the information at the output of the information input device is represented by pulses having a duration according to the respective coordinate, pulse duration modulation is carried out. Therefore, the data to be fed into the transmission lines exhibits a high noise immunity, thus allowing data transmission over a considerable distance.

According to the invention, the input of information into the input device is carried out by simultaneously but not time-sequentially closing the circuit through the row and the column conductor lines 2 and 3 of the connecting matrix 1. Therefore, the operational speed of the input device is considerably increased.

As two corresponding first row conductor lines 2 and two corresponding first column conductor lines 3 of the connecting matrix 1 are respectively connected to one channel of the first and the second multiple channel delay circuit 4 and 5, respectively, the duration of the pulses generated by the pulse generators 11 and 12 alone would identify two associated coordinates of a node X.

However, when a first row conductor line 2 and a first column conductor line 3 are closed by the probe pin 20, in the region, where the parallelly arranged additional row and column conductor lines 15 and 16 of the connecting matrix 1 are arranged ,namely in the region thereof where the second half parts of the first row and column conductor lines 2 and 3 are provided, the additional row and column conductor lines 15 and 16 are closed simultaneously, thus making the energizing voltage $V_{imp}$ to be applied to the additional delay elements 13 and 14 which generate inversion signals after a pre-determined, fixed time interval at the output terminals 36, 37 of the additional delay elements 13 and 14.

Said inversion signals generated at the output terminals 36, 37 of the additional delay elements 13, 14 are applied to the outputs 24, 26 of the first and second pulse generators 11 and 12 , respectively to thereby reduce the pulse duration of the output pulse signals of the first and second pulse generators 11, 12, respectively, for example by a factor 2 for all coordinates where the probe pin 20 closes a node X in the region of the additional row conductor lines 15 and the additional column conductor lines 16. Nevertheless, the definite correspondence between the duration of the output pulses of the first and second pulse generators 11, 12 and the input coordinate information, that is the coordinate of the node X represented by the respective location of first row and column conductor lines 2, 3 and the additional row and column conductor lines 15, 16 where they are closed by the probe pin 20 is ascertained.

When a node X of the connecting matrix 1 is continuously closed and energized by the probe pin 20, the free-running oscillator 17 begins, after a delay of its oscillation start time of e.g. one second, to generate the oscillations with a pre-determined frequency controlling the closing and opening of the switch 18. That is, the switching on and off of the energizing voltage $V_{inp}$ applied to the node X of the connecting matrix 1 will periodically repeat the pulses generated at the output terminals 24, 26 of the pulse generators 11 and 12, thus realizing an automatic repetition of the coordinate according to input information of the respectively energized node X of the connecting matrix 1.

That is, the present information input device as described guarantees to transmit the input information with high transmission speed through long two-wire connecting lines.

When the components are implemented by using a microcircuit having switching frequencies of hundreds of MHz, the response time of the information input device will be equal to about 1/100th μs.

The present invention can effectively be used for putting in information to distributed data processing systems, e.g. teaching systems equipped with displays and other multiple-user- and multiple-terminal-data-processing systems.

This is due to the large extension of the connecting lines required in distributed computer systems.

We claim:

1. An information input device, comprising:

a connecting matrix including a plurality of n first parallel row conductor lines and a plurality of m first parallel column conductor lines being disposed orthogonally to said row conductor lines, m being equal to or unequal to n, and the crossing points of said first row conductor lines and said first column conductor lines forming nodes of the connecting matrix;

a voltage source;

a probe pin being coupled to said voltage source for connecting with and closing the row conductor lines and the column conductor lines at the nodes of the connecting matrix;

a first multiple channel delay circuit, the number of channels of said first multiple channel delay circuit depending on the number n of the first row conductor lines, wherein the delay time in each of said channels differs from the delay time in all other channels of said first multiple channel delay circuit, the input terminal of each channel of said first multiple channel delay circuit being connected to first ends of associated conductor lines of said first row conductor lines of said connecting matrix and the output terminals of said channels being connected together and form the output terminal of said first multiple channel delay circuit;

a second multiple channel delay circuit, the number of channels of said second multiple channel delay circuit depending on the number m of said first column conductor lines, wherein the delay time in each of said channels of said second multiple channel delay circuit differs from the delay time in all other channels of said second multiple channel delay circuit, the input terminal of each channel being connected with first ends of associated conductor lines of said first column conductor lines, and the output terminals of said channels are connected together and forming the output of said second multiple channel delay circuit;

a NOR circuit having multiple inputs being connected either to all second ends of said first column conductor lines or to all second ends of said first row conductor lines;

a first pulse generator having its trigger input connected to an output of said NOR circuit and its reset input connected to said output of said first multiple channel delay circuit; and a second pulse generator having its trigger input connected to said output of said NOR circuit and its reset input connected to said output of said second multiple channel delay circuit, wherein the duration of pulses generated at the respective output terminals of said first and second pulse generators correspond respectively to coordinates of row conductor line and column conductor line being closed and energized at the present moment by the probe pin, wherein the number of the channels of said first multiple channel delay circuit is equal to or greater than n/2;

said n first row conductor lines comprise a first portion of row conductor lines their number corresponding to said number of said channels of said first multiple channel delay circuit, said first portion of row conductor lines being provided as single row conductor lines within the connecting matrix and the remaining portion of said first row conductor lines comprising additional row conductor lines, each additional row conductor line being provided in parallel and adjacent to an associated line of the second portion of said first row conductor lines, wherein the additional row conductor lines also form nodes of the connecting matrix in combination with crossing column conductor lines and in combination with said adjacent first row conductor lines, first end terminals of all of said additional row conductor lines being connected together and to an input of a first additional delay element having an output being connected to said output of said first pulse generator, said first additional delay element generating a signal being inverted with respect to the signal at the output of said first pulse generator a pre-determined fixed, time interval after a contact of said probe pin at a respective node of the connecting matrix is effected within the region of said additional row conductor lines, whereby said inverted signal is an indication that the duration of an output pulse generated by said first pulse generator indicates the respective coordinate of a row conductor line of the second portion within the region of said additional row conductor lines.

2. The information input device according to claim 1, wherein the number of said channels of said second multiple channel delay circuit is equal to m/2 or greater than m/2, a first portion of said m first column conductor lines in said connecting matrix corresponding to the number of said channels of said second multiple channel delay circuit is provided as single conductor lines and a second portion the said first column conductor lines comprises additional column conductor lines, each additional column conductor line being provided in parallel and adjacent to an associated line of the second portion of column conductor lines, wherein the additional column conductor lines also form connecting nodes of the connecting matrix in combination with said first column conductor lines and in combination with said first and additional row conductor lines, first terminals of all of said additional column conductor lines are connected together and to an input of a second additional delay element having an output being connected to said output of said second pulse generator, said second additional delay element generating a signal being inverted with respect to the signal of the second pulse generator a pre-determined delay interval after a contact of said probe pin at a respective node of the connecting matrix within the region of said additional column conductor lines is effected wherein said inverted signal is an indication that the duration of an output pulse generated by said second pulse generator indicates the respective coordinate of a column conductor line of the second portion within the region of said additional column conductor lines.

3. The information input device according to claim 1, wherein the number of said channels of said first multiple channel delay circuit is equal to n/2, and the first multiple channel delay circuit comprises n/2 resistors being connected together at first ends thereof, all resistors having different resistance values, and a capacitor being connected to said connected first ends of said resistors, wherein the second ends of said resistors are respectively connected to said associated first row conductor lines.

4. The information input device according to claim 2, wherein the number of said channels of said second multiple channel delay circuit is equal to m/2, and said second multiple channel delay circuit comprises m/2 resistors having first ends which are connected together , all resistors having a different resistance values, and a capacitor being connected to said connected first ends of said resistors, wherein the second ends of said resistors are respectively connected to said associated first column conductor lines.

5. The information input device according to claim 3, wherein said connecting matrix provides said first portion of n/2 first row conductor lines as single lines and n/2 of said additional row conductor lines in parallel and adjacent to said second portion of n/2 first row conductor lines.

6. The information input device according to claim 4, wherein said connecting matrix provides said first portion of m/2 first column conductor lines as single lines and m/2 of said additional column conductor lines in parallel and adjacent to said second portion of m/2 first column conductor lines.

7. The information input device according to claim 1, wherein said output of said NOR circuit is further connected to an input of a free-running oscillator, the start point of the oscillation of said oscillator is delayed by a pre-determined time period from the time when said probe pin contacts a node of said connection matrix, and an output of said oscillator is coupled with a control terminal for on/off-controlling said switch which further comprises an input connected to said voltage source and an output connected to said probe pin so that if the probe pin continuously contacts a node of said connecting matrix during a longer time period, the output signals of said first and second pulse generators indicating said coordinates are periodically repeated , said period being determined by the oscillation frequency of said free-running oscillator.

8. The information input device according to claim 1, wherein said output of said NOR circuit is connected with an input of a free-running oscillator, the start point of the oscillation of said oscillator is delayed by a pre-determined time period from the time when said probe pin contacts a node of said connection matrix, and an output of said oscillator is coupled with a control terminal for on/off-controlling said switch which further comprises an input connected to said voltage source and an output connected to said probe pin so that if the probe pin continuously contacts a node of said connecting matrix during a longer time period, the output signals of said first and second pulse generators indicating said coordinates are periodically repeated, said period being determined by the oscillation frequency of said free-running oscillator.

* * * * *